(12) United States Patent
Huang et al.

(10) Patent No.: US 12,494,887 B2
(45) Date of Patent: Dec. 9, 2025

(54) COMBINABLE A SUB-RESOURCE BLOCK (RB) SOUNDING REFERENCE SIGNAL (SRS) TRANSMISSION FOR COVERAGE ENHANCEMENT

(71) Applicant: QUALCOMM Incorporated, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 18/009,199

(22) PCT Filed: Jun. 8, 2020

(86) PCT No.: PCT/CN2020/094867
§ 371 (c)(1),
(2) Date: Dec. 8, 2022

(87) PCT Pub. No.: WO2021/248264
PCT Pub. Date: Dec. 16, 2021

(65) Prior Publication Data
US 2023/0239124 A1    Jul. 27, 2023

(51) Int. Cl.
*H04L 5/00*    (2006.01)
*H04W 72/0453*    (2023.01)

(52) U.S. Cl.
CPC .......... *H04L 5/0094* (2013.01); *H04L 5/0051* (2013.01); *H04W 72/0453* (2013.01)

(58) Field of Classification Search
CPC ... H04L 5/0094; H04L 5/0051; H04L 5/0007; H04L 25/0226; H04L 27/2613; H04L 5/0048; H04W 72/0453
See application file for complete search history.

(56) References Cited

U.S. PATENT DOCUMENTS

| | | | |
|---|---|---|---|
| 2018/0076946 A1* | 3/2018 | Li | H04W 72/0446 |
| 2018/0213513 A1* | 7/2018 | Sun | H04W 72/23 |
| 2018/0278384 A1* | 9/2018 | Manolakos | H04L 5/0044 |
| 2019/0053103 A1 | 2/2019 | Manolakos et al. | |

(Continued)

FOREIGN PATENT DOCUMENTS

| | | |
|---|---|---|
| CN | 108111279 A | 6/2018 |
| CN | 109547180 A | 3/2019 |
| CN | 111224762 A | 6/2020 |

OTHER PUBLICATIONS

Huawei, et al., "SRS Design for NR Positioning," 3GPP TSG RAN WG1 Meeting #98bis, R1-1910034, Oct. 14-20, 2019 (Oct. 20, 2019), 20 pages, the whole document.

(Continued)

*Primary Examiner* — Thai Nguyen
(74) *Attorney, Agent, or Firm* — ArentFox Schiff, LLP

(57) ABSTRACT

The present disclosure relates to combinable a sub-resource block (RB) sounding reference signal (SRS) transmission for coverage enhancement. Specifically, a network entity may transmit, and a user equipment (UE) may receive a sub-RB SRS configuration message, and a transmit one or more sub-RB SRS. The UE may receive a sub-RB SRS configuration message and transmit one or more sub-RB SRS.

30 Claims, 9 Drawing Sheets

(56) References Cited

U.S. PATENT DOCUMENTS

2020/0235881 A1* 7/2020 Choi .................... H04B 1/713
2020/0275260 A1* 8/2020 Huang ................. H04L 5/0051

OTHER PUBLICATIONS

International Search Report and Written Opinion—PCT/CN2020/094867—ISA/EPO—Mar. 10, 2021.
Vivo: "Discussion on SRS Design and Related Aspects," 3GPP TSG RAN WG1 NR Ad Hoc #3, R1-1715625, Sep. 18-21, 2017, Sep. 20, 2017 (Sep. 20, 2017), 4 pages, the whole document.

* cited by examiner

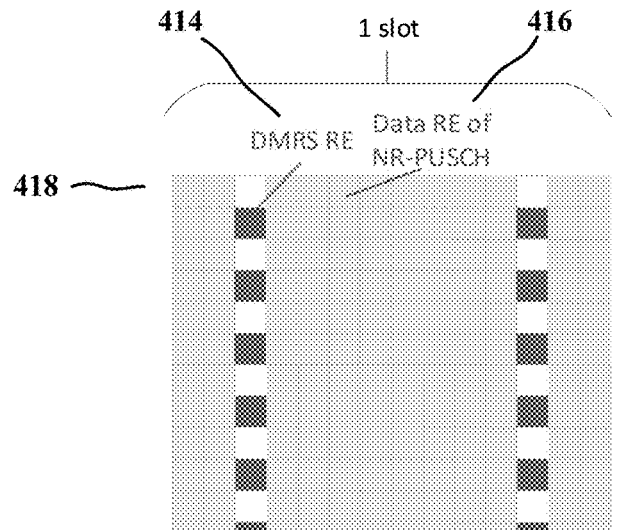
regular NR UE with DMRS of CDM group 1
412
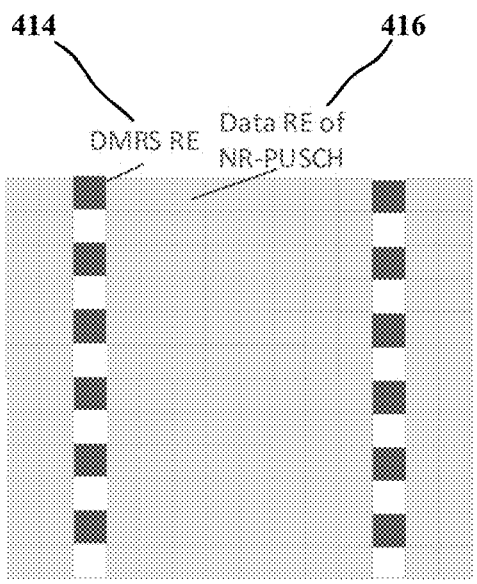
regular NR UE with DMRS of CDM group 2
422
FIG. 4B

500

```
┌─────────────────────────────────────────┐
│ Receive, from a network entity, a sub-resource block
│ (RB) sounding reference signal (SRS) configuration
│ message, the sub-RB SRS configuration message        502
│ including at least one of a group of symbol indexes, a RB
│ index, a frequency resource size and a frequency
│ resource position at each symbol, a frequency resource
│ shifting pattern, and a SRS sequence segment for each
│ symbol
└─────────────────────────────────────────┘
                    │
                    ▼
┌─────────────────────────────────────────┐
│ Transmit, to the network entity, one or more sub-RB   504
│ SRS based on the sub-RB SRS configuration message
└─────────────────────────────────────────┘
```

FIG. 5

COMBINABLE A SUB-RESOURCE BLOCK (RB) SOUNDING REFERENCE SIGNAL (SRS) TRANSMISSION FOR COVERAGE ENHANCEMENT

CROSS-REFERENCE TO RELATED APPLICATIONS

This application is a 35 U.S.C. § 371 National Phase Application of PCT Application No. PCT/CN2020/094867 filed Jun. 8, 2020, entitled "COMBINABLE A SUB-RESOURCE BLOCK (RB) SOUNDING REFERENCE SIGNAL (SRS) TRANSMISSION FOR COVERAGE ENHANCEMENT," which is assigned to the assignee hereof and hereby incorporated by reference herein.

BACKGROUND

Aspects of the present disclosure relate generally to wireless communication systems, and more particularly, to combinable a sub-resource block (RB) sounding reference signal (SRS) transmission for coverage enhancement.

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) including receiving, from a network entity, a sub-resource block (RB) sounding reference signal (SRS) configuration message, the sub-RB SRS configuration message including at least one of a group of symbol indexes, a RB index, a frequency resource size and a frequency resource position at each symbol, a frequency resource shifting pattern, and a SRS sequence segment for each symbol; and transmitting, to the network entity, one or more sub-RB SRS based on the sub-RB SRS configuration message.

Another example implementation includes a method of wireless communication at a network entity including transmitting, to a UE, a sub-RB SRS configuration message, the sub-RB SRS configuration message including a group of symbol indexes, a RB index, a frequency resource size and a frequency resource position at each symbol, a frequency resource shifting pattern, and a SRS sequence segment for each symbol; and receiving, from the UE, one or more sub-RB SRS based on the sub-RB SRS configuration message.

In a further example, an apparatus for wireless communication is provided that includes a transceiver, a memory configured to store instructions, and one or more processors communicatively coupled with the transceiver and the memory. The one or more processors are configured to execute the instructions to perform the operations of the methods described herein. In another aspect, an apparatus for wireless communication is provided that includes means for performing the operations of methods described herein. In yet another aspect, a non-transitory computer-readable medium is provided including code executable by one or more processors to perform the operations of the methods described herein.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4B is an example representation of a narrow band with demodulation reference signal (DMRS) of various code-division multiplexing (CDM) groups.

FIG. 5 is a flowchart of an example method of wireless communication at a UE.

Like reference numbers and designations in the various drawings indicate like elements.

Figure 1:
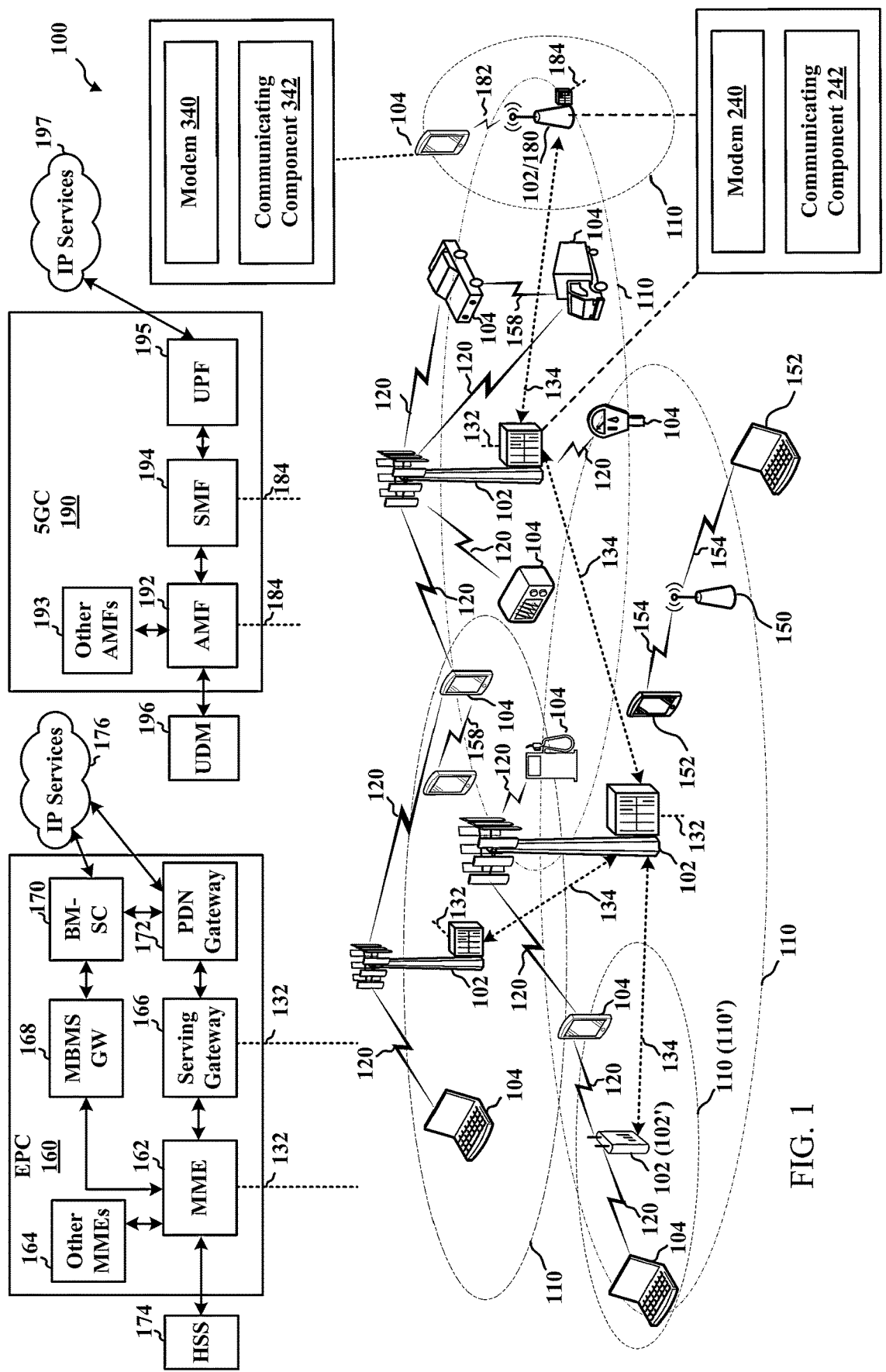
FIG. 1 illustrates an example of a wireless communication system.

An Appendix is included that is part of the present application and provides additional details related to the various aspects of the present disclosure.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to combinable a sub-resource block (RB) sounding reference signal (SRS) transmission for coverage enhancement. Specifically, a narrow band (NB) Internet-of-Things (IoT) technique may be used to enhance uplink coverage for a user equipment (UE) that suffers from large pathloss, e.g., lies in a cell edge or coverage hole (i.e., blocked by high building). One example approach may be to decrease a minimum allowable transmission bandwidth of an uplink transfer channel (i.e., NB-PUSCH) from one RB to less than one RB, e.g., less than twelve subcarriers/tones. With such approach, the UE can concentrate a transmission power into a smaller frequency-domain bandwidth so that the transmission power at each frequency domain (FD) resource unit may be increased.

Further, the DMRS of the NB-PUSCH may use the same frequency resource as the PUSCH data REs. For example, the DMRS REs may occupy one or three symbols in the middle of a slot, while the data REs of the NB-PUSCH may occupy the other symbols. Both of the DMRS REs and the data REs may occupy all the subcarriers or tones of the entire NB-PUSCH bandwidth. Because the number of DMRS REs and the data REs at one symbol may be the same, the transmit power at one DMRS RE and at one data RE may also be the same.

However, some implementations of NB-IoT may suffer from drawbacks when applied to 5G NR. One such drawback includes a lack of compatibility with an NR UE. Another may include SRS reception and uplink beamforming for cell edge UEs. As such, to overcome such drawbacks, the present disclosure provides techniques for transmitting, by a UE, a group of sub-RB SRS signals at shifted frequency resources of multiple symbols, where the used frequency resources of these symbols constitute a full RB, and the transmitted sequences of these symbols constitute a continuous SRS sequence with a certain cyclic shift. The network entity (e.g., gNB) may jointly demodulate these sub-RB SRSs based on the combined full RB received signal.

Particular implementations of the subject matter described in this disclosure can be implemented to realize one or more of the following potential advantages. The present aspects set forth techniques for multiplexing with full-RB SRS. Specifically, if another full-RB SRS is transmitted simultaneously at the same RB, the received full-RB SRS and combined sub-RB SRS have the same orthogonality as two full-RB SRSs, because the combined sub-RB SRS has identical sequence length as the full-RB SRS. This may reduce or remove the mutual interference of full-RB SRS and sub-RB SRS. Assuming a sub-RB SRS occupies one half of a frequency resource of a RB and two cyclic shifts are configured. Without combinable sub-RB SRS, the radio resource at one RB and two symbols may either used by four full-RB SRS users or four sub-RB SRS users, without mixed full-RB users and sub-RB users. With this invention, the same radio resource may be used by mixed full-RB users and sub-RB users, such as two full-RB SRS users and two sub-RB SRS users. The combinable sub-RB SRS adds to the SRS resource allocation flexibility.

Additionally, the present aspects set forth techniques for gains on SRS channel estimation. For example, compared with performing channel estimation based on the received sub-RB SRS signal, the coherent combining gain is improved in performing channel estimation based on the received combined full-RB SRS signal. The sub-RB SRS combination pattern may have better channel estimation performance (due to higher receive SINR and diversity gain) than simply transmitting a single SRS at a sub-RB frequency resource. The combinable sub-RB SRS benefits the performance of UL scheduling, UL beamforming, DL beamforming and thus coverage enhancement for the cell-edge UEs.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A)

are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. or may not include all of the devices, components, modules etc. discussed in connection with the figures. A combination of these approaches also can be used.

FIG. 1 illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells (low power cellular base station). The macro cells can include base stations. The small cells can include femtocells, picocells, and microcells. In an example, the base stations 102 also may include gNBs 180, as described further herein.

In one example, some nodes such as base station 102/gNB 180, may have a modem 240 and communicating component 242 for transmitting, to a UE, a sub-RB SRS configuration message, the sub-RB SRS configuration message including a group of symbol indexes, a RB index, a frequency resource size and a frequency resource position at each symbol, a frequency resource shifting pattern, and a SRS sequence segment for each symbol; and receiving, from the UE, one or more sub-RB SRS based on the sub-RB SRS configuration message, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for receiving, from a network entity, a sub-RB SRS configuration message, the sub-RB SRS configuration message including at least one of a group of symbol indexes, a RB index, a frequency resource size and a frequency resource position at each symbol, a frequency resource shifting pattern, and a SRS sequence segment for each symbol; and transmitting, to the network entity, one or more sub-RB SRS based on the sub-RB SRS configuration message, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 6:
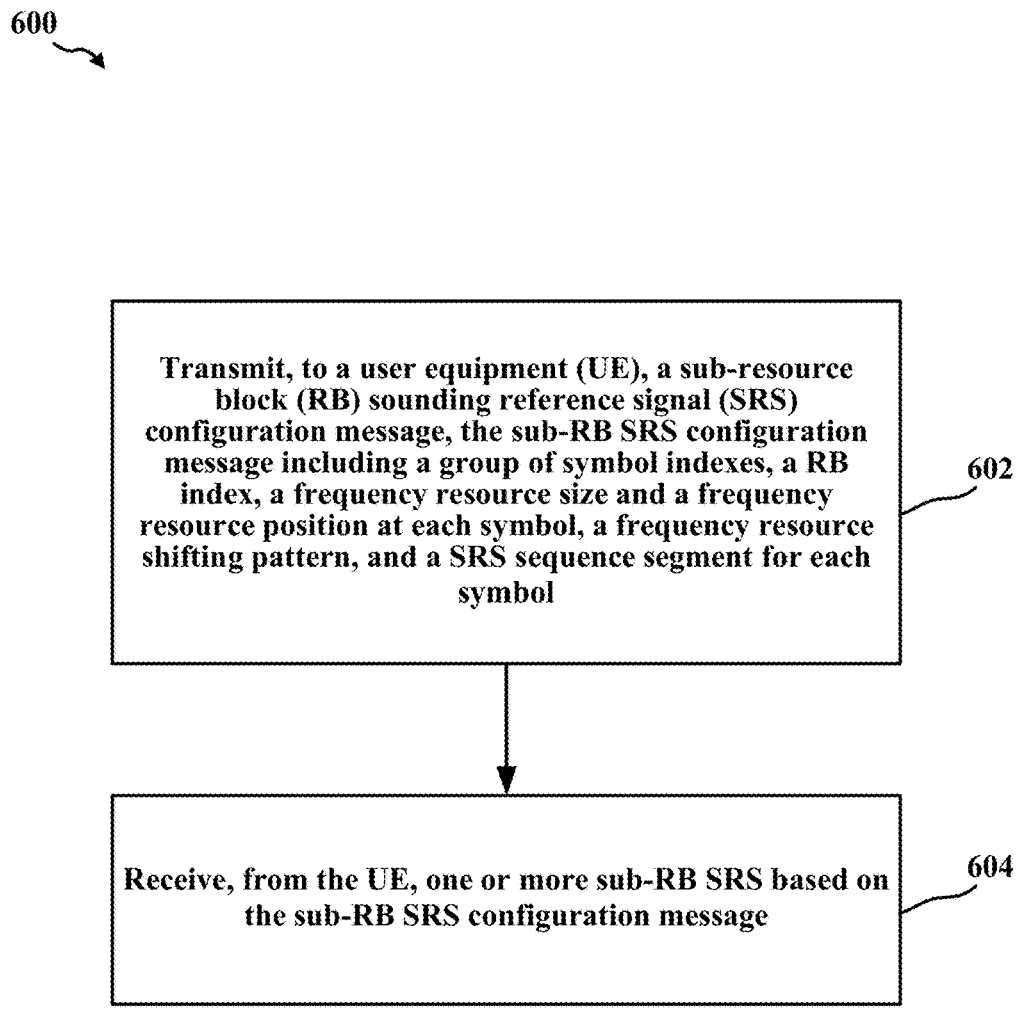
FIG. 6 is a flowchart of another example method of wireless communication at a network entity.

Turning now to FIGS. 2-7, aspects are depicted with reference to one or more components and one or more methods that may perform the actions or operations described herein, where aspects in dashed line may be optional. Although the operations described below in FIGS. 5 and 6 are presented in a particular order or as being performed by an example component, it should be understood that the ordering of the actions and the components performing the actions may be varied, depending on the implementation. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 2:
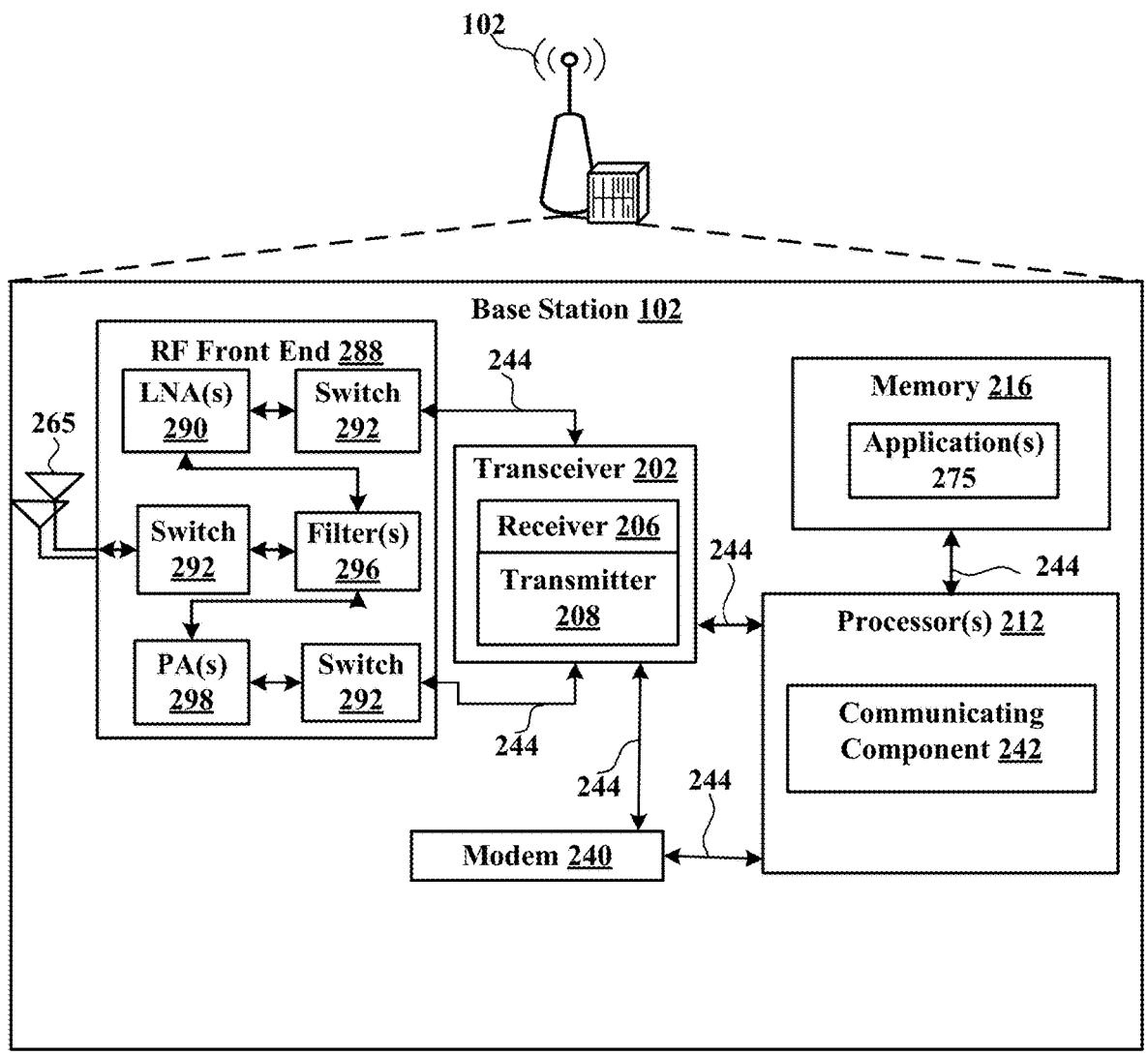
FIG. 2 is a block diagram illustrating an example of a network entity (also referred to as a base station).

FIG. 2 is a block diagram illustrating an example of a network entity (also referred to as a base station). The base station (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242 for sending a sub-RB SRS configuration message to a coverage-enhancement UE (such as UE 104), and receiving a sub-RB SRS transmission from the UE.

In some aspects, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In some aspects, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIGS. 4 and 6. Similarly, the memory 216 may correspond to the memory described in connection with the UE in FIG. 7.

Figure 3:
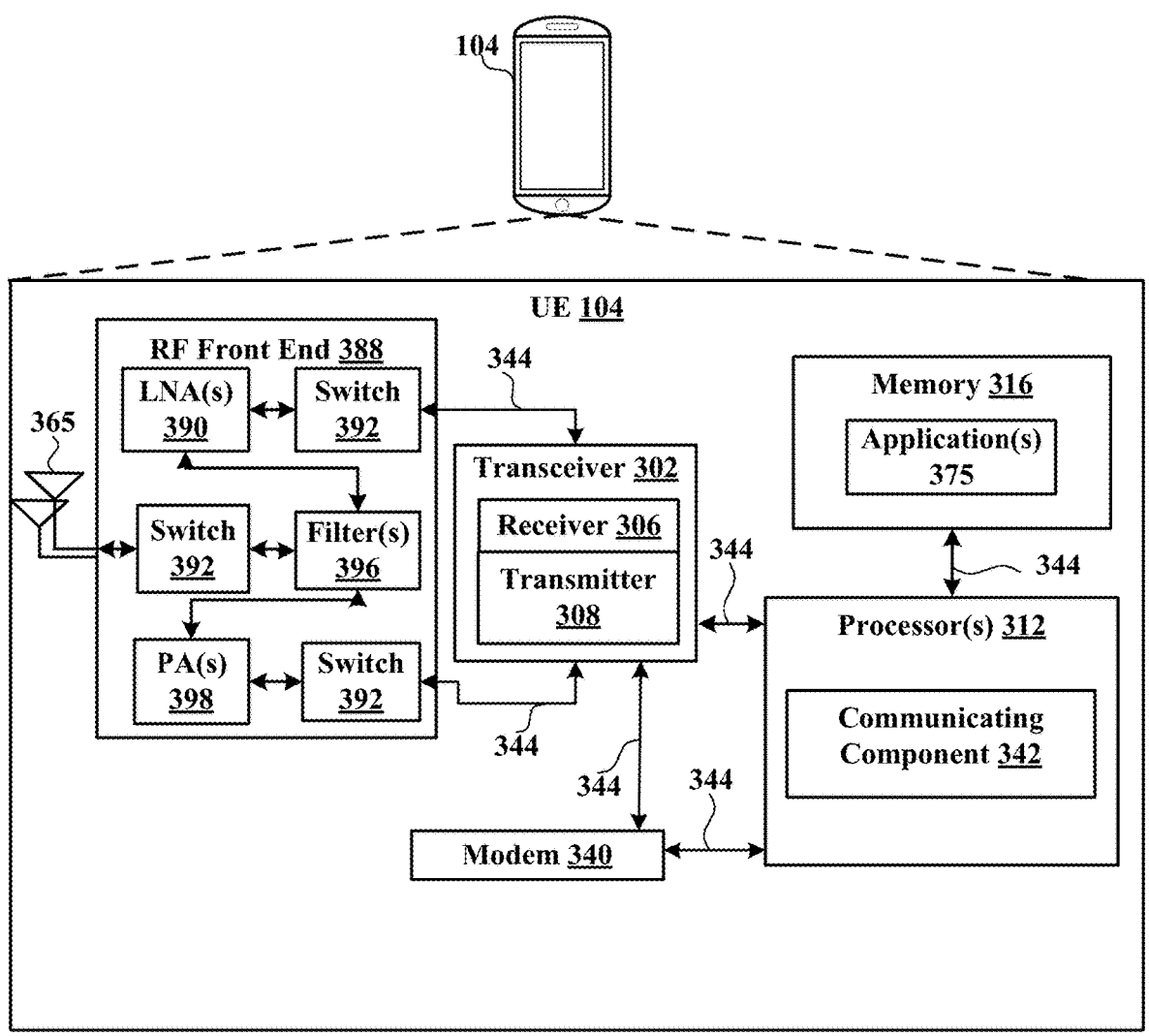
FIG. 3 is a block diagram illustrating an example of a user equipment (UE).

FIG. 3 is a block diagram illustrating an example of a UE 104. The UE 104 may include a variety of components, some of which have already been described above and are described further herein, including components such as one or more processors 312 and memory 316 and transceiver 302 in communication via one or more buses 344, which may operate in conjunction with modem 340 or communicating component 342 for receiving, to base station 104, a sub-RB SRS.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In some aspects, the processor(s) 312 may correspond to one or more of the processors described in connection with the base station in FIG. 7. Similarly, the memory 316 may correspond to the memory described in connection with the base station in FIG. 7.

Figure 4A:
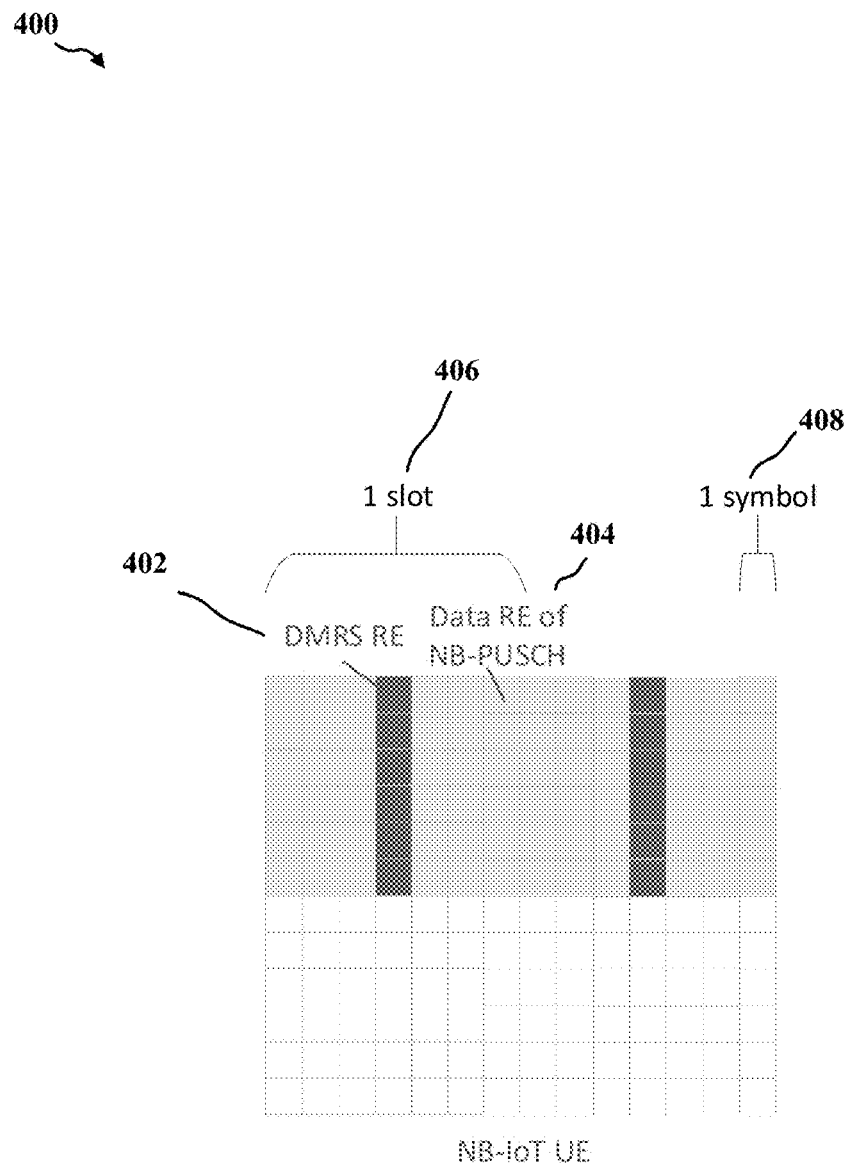
FIG. 4A is an example representation of a narrow band Internet-of-Things (IoT) bandwidth.
Figure 7:
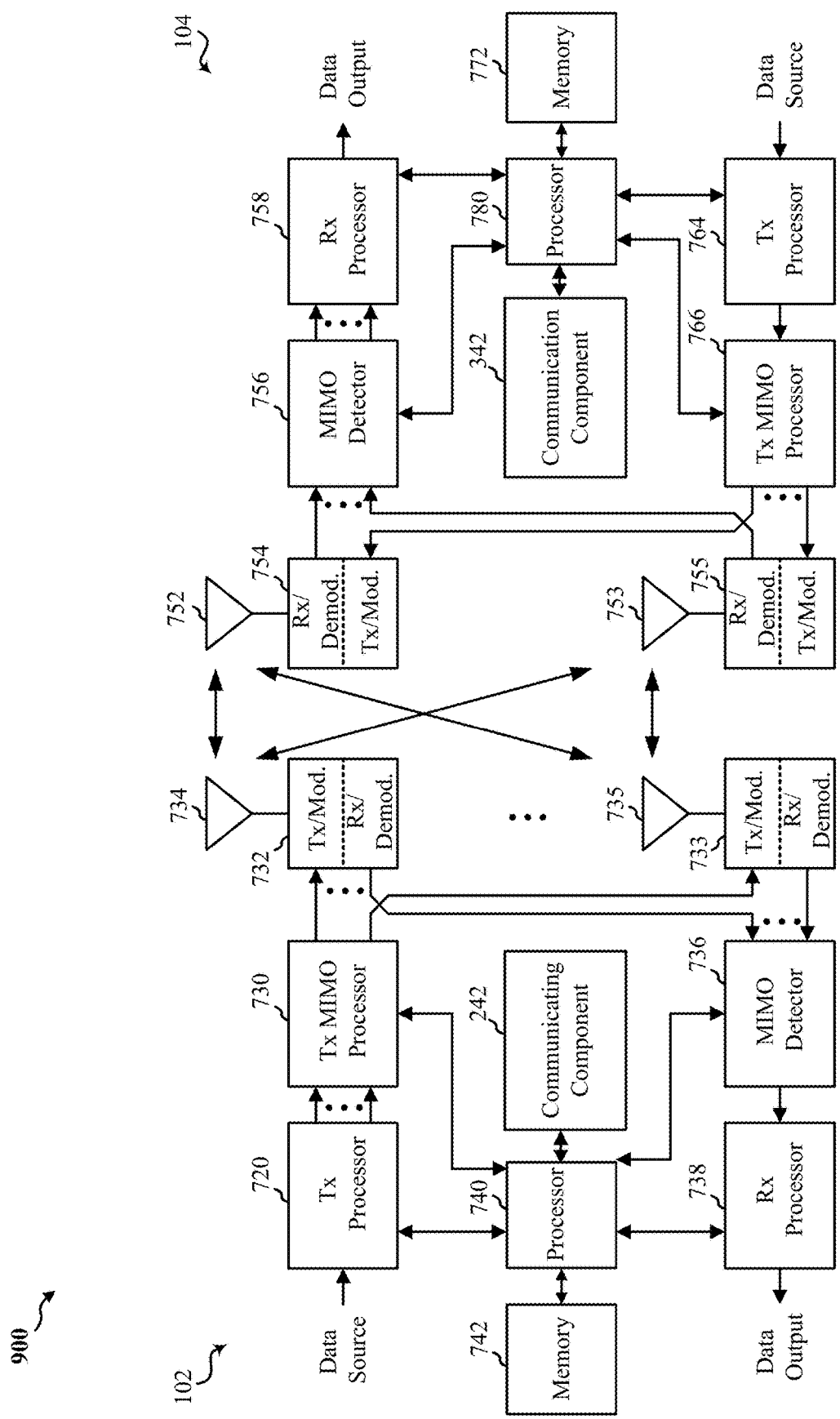
FIG. 7 is a block diagram illustrating an example of a multiple-input and multiple-output (MIMO) communication system including a base station and a UE.

FIG. 4A is an example representation of a NB IoT bandwidth 400 for a UE such as UE 104, FIGS. 1, 3, and 7. For example, the NB IoT bandwidth 400 may include a number of slots including slot 406, which may in turn include a number of REs. Specifically, the slot 406 may include DMRS RE 402 and at least one data RE of NB-PUSCH 404. Further, on or more REs may form a single symbol length 408. That is, one symbol 408 may correspond to at least one RE.

FIG. 4B is an example representation of a narrow band with DMRS of various code-division multiplexing (CDM) groups 410. One example may include an NR UE (e.g., UE 104, FIGS. 1, 3, and 7) with DMRS of CDM group one 412. In this example, a single slot may include a number of DMRS REs 414 and data REs of NR-PUSCH 416. A frequency tone 418 may include a number of data REs of NR-PUSCH 416 and at least one DMRS RE 414. The DMRS for CDM group one may be a first DMRS pattern. Another example may include an NR UE with DMRS of CDM group one 422. In this example, the overall resource structure may be similar to CDM group one 412 except that the DMRS REs 414 are arranged according to a different DMRS pattern compared to CDM group one 412.

One of the areas of improvement in 5G NR may be to enhance uplink coverage for the UE that resides in a cell edge or coverage hole. To serve this purpose, decreasing the transmission bandwidth may be a promising approach, which may boost the transmission power at each frequency division (FD) resource unit (e.g., a RE) and thus improve receiving signal-to-interference-and-noise ratio (SINR) value. However, simply reusing the NB-IoT technique in 5G NR spectrum may be inefficient, because an NB-IoT UE may not support co-transmission with another non-NB-IoT NR UE (i.e., the 5G NR UEs that do not reside in a cell edge or coverage hole) at the same FD resource.

For example, an NB-IoT UE and a non-NB-IoT NR UE may not co-transmit in a MU-MIMO manner as they may have different DMRS formats. Further, the DMRS for PUSCH (e.g., NR-PUSCH) may be divided into two or three CDM groups, where each group includes interleaved REs in the frequency domain (i.e., a comb pattern), which may be different from an NB-PUSCH DMRS's continuous time-frequency mapping mode. Therefore, once an uplink PRB is allocated to an NB-IoT UE for NB-PUSCH transmission, the uplink PRB may not be simultaneously allocated to another non-NB-IoT NR UE for an NR-PUSCH transmission.

Another shortfall of some PUSCH implementations (e.g., including NB-PUSCH) may be the weak channel estimation performance for cell-edge or coverage-hole UEs. For example, low SINR at the DMRS REs may degrade the channel estimation performance, resulting in high mean squared error (MSE) of estimation results, and moreover weak PUSCH receive performance.

Considering the interleaving mapping of DMRS REs of a CDM group, if the energy per RE (EPRE) is identical between a DMRS RE and a data RE, the total transmission power of one DMRS symbol may be only a fraction of the total transmission power of one data symbol if the DMRS REs and data REs are spread identically along a frequency bandwidth. Such unused power may provide some room to enhance channel estimation performance for the DMRS REs of sub-RB PUSCH.

In particular, a UE may transmit a DMRS at a subset of frequency tones (or subcarriers) of a DMRS symbol out of all the frequency tones of a data symbol of a sub-RB PUSCH, which may be configurable based on coverage enhancement parameters and channel status. The transmit power of one frequency tone of the DMRS symbol may be 'M' times of the transmit power of one frequency tone of the data symbol, satisfying $$M \leq \frac{N_{data}}{N_{DMRS}},$$

where $N_{data}$ is the number of frequency tones of data symbol of PUSCH, and $N_{DMRS}$ is the number of frequency tones of DMRS symbol of PUSCH.

When the frequency-domain channel variance within a PUSCH bandwidth is high, the positions of DMRS REs can shift along the frequency domain in multiple DMRS symbols (e.g., of one or multiple slots), which may be referred to as frequency shifting of DMRS. Additionally, DMRS REs may be arranged in a comb pattern (e.g. every two subcarriers/tones) in the frequency domain, while data REs are arranged continuously. Hence, given the same total transmit power, transmitting at less frequency tones can provide larger maximum transmit power per frequency tone.

Figure 4C:
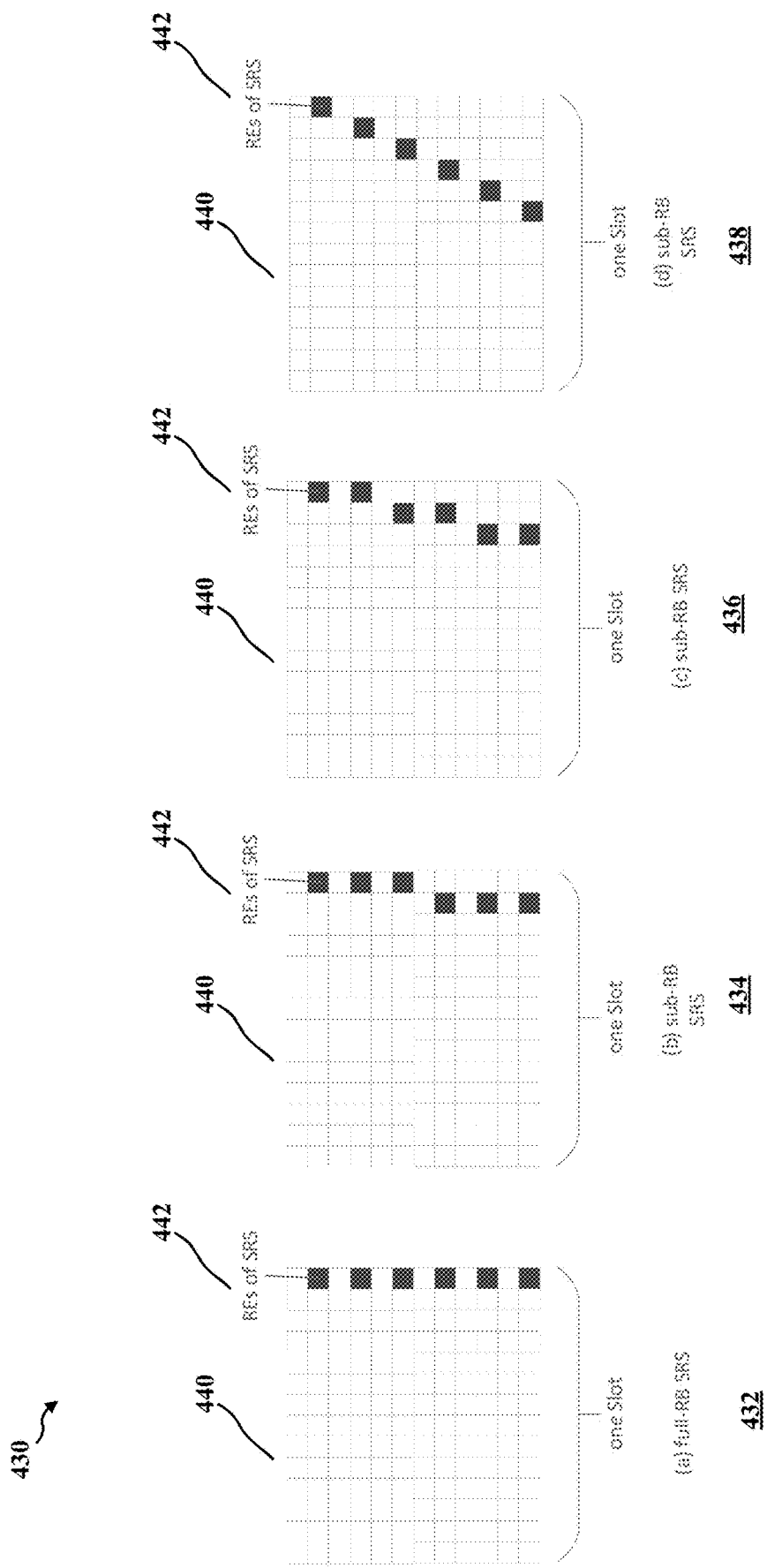
FIG. 4C illustrates various example combinable sub-resource block (RB) sounding reference signal (SRS) transmission patterns.

FIG. 4C illustrates various example combinable sub-resource block (RB) sounding reference signal (SRS) transmission patterns. A first example 432 may be associated with a full-RB SRS, whereas the second example 434, third example 436, and fourth example 438 may correspond to a coverage enhancement or sub-RB SRS configured UE. In each example, a number of DMRS REs 440 and data REs 442 may be configured or otherwise allocated per slot.

Specifically, for examples 434, 436, and 438 each SRS signal is transmitted in a fraction (e.g., ½, ⅓, and ⅙) of the frequency resource of a RB at one symbol. The frequency resources of the SRS signals constitute a full RB (e.g., the frequency resources of adjacent symbols are shifted from low to high, from high to low, or in any given order). The transmitted sequences at these fractions are continuous according to the order of frequency resource from low to high or from high low.

The transmitted sequences allow for multiplexing with full-RB SRS. Specifically, if another full-RB SRS is transmitted simultaneously at the same RB, the received full-RB SRS and combined sub-RB SRS have the same orthogonality as two full-RB SRSs, because the combined sub-RB SRS has identical sequence length as the full-RB SRS. This may reduce or remove the mutual interference of full-RB SRS and sub-RB SRS. Assuming a sub-RB SRS occupies one half of a frequency resource of a RB and two cyclic shifts are configured. Without combinable sub-RB SRS, the radio resource at one RB and two symbols may either used by four full-RB SRS users or four sub-RB SRS users, without mixed full-RB users and sub-RB users. With this invention, the same radio resource may be used by mixed full-RB users and sub-RB users, such as two full-RB SRS users and two sub-RB SRS users. These combinable sub-RB SRS add to the SRS resource allocation flexibility.

Additionally, transmitting the sequences allows for gains on the SRS channel estimation. For example, compared with performing channel estimation based on the received sub-RB SRS signal, the coherent combining gain is improved in performing channel estimation based on the received combined full-RB SRS signal. The sub-RB SRS combination pattern may have better channel estimation performance (due to higher receive SINR and diversity gain) than simply transmitting a single SRS at a sub-RB frequency resource. The combinable sub-RB SRS benefits the performance of UL scheduling, UL beamforming, DL beamforming and thus coverage enhancement for the cell-edge UEs.

FIG. 5 is a flowchart of an example method 500 of wireless communication at an apparatus of a UE. In an example, a UE 104 can perform the functions described in method 500 using one or more of the components described in FIGS. 1, 3 and 7.

At block 502, the method 500 may receive, from a network entity, a sub-RB SRS configuration message, the sub-RB SRS configuration message including at least one of a group of symbol indexes, a RB index, a frequency resource size and a frequency resource position at each symbol, a frequency resource shifting pattern, and a SRS sequence segment for each symbol. In some aspects, the communicating component 342, such as in conjunction with processor(s) 312, memory 316, or transceiver 302, may be configured to receive, from a network entity, a sub-RB SRS configuration message, the sub-RB SRS configuration message including at least one of a group of symbol indexes, a RB index, a frequency resource size and a frequency resource position at each symbol, a frequency resource shifting pattern, and a SRS sequence segment for each symbol. Thus, the UE 104, the processor(s) 312, the communicating component 342 or one of its subcomponents may define the means for receiving, from a network entity, a sub-RB SRS configuration message, the sub-RB SRS configuration message including at least one of a group of symbol indexes, a RB index, a frequency resource size and a frequency resource position at each symbol, a frequency resource shifting pattern, and a SRS sequence segment for each symbol.

At block 504, the method 500 may transmit, to the network entity, one or more sub-RB SRS based on the sub-RB SRS configuration message. In some aspects, the communicating component 342, such as in conjunction with processor(s) 312, memory 316, or transceiver 302, may be configured to transmit, to the network entity, one or more sub-RB SRS based on the sub-RB SRS configuration message. Thus, the UE 104, the processor(s) 312, the communicating component 342 or one of its subcomponents may define the means for transmitting, to the network entity, one or more sub-RB SRS based on the sub-RB SRS configuration message.

In some implementations, the frequency resource size corresponds to a proportional value of the RB.

In some implementations, the frequency resource position corresponds a starting position of a frequency resource of each symbol or a frequency shift rule.

In some implementations, the frequency resource shifting pattern corresponds to an allocation of frequency resources to each symbol.

In some implementations, the SRS sequence segment corresponds to a segment of a continuous SRS sequence used at each symbol.

In some implementations, the communicating component 342, such as in conjunction with processor(s) 312, memory 316, or transceiver 302, may be configured to receive the sub-RB SRS configuration message further comprises receiving the sub-RB SRS configuration message via at least one of radio resource control (RRC) layer signaling, media access control (MAC) control element (CE), or downlink control information (DCI).

In some implementations, the communicating component 342, such as in conjunction with processor(s) 312, memory 316, or transceiver 302, may be configured to transmit the one or more sub-RB SRS further comprises transmitting a group of sub-RB SRS at shifted frequency resources of multiple symbols.

In some implementations, the shifted frequency resources of the multiple symbols comprise a full RB.

In some implementations, a transmission sequence segment of the multiple symbols comprise a continuous SRS sequence with a cyclic shift.

In some implementations, the communicating component 342, such as in conjunction with processor(s) 312, memory 316, or transceiver 302, may be configured to transmit the group of sub-RB SRS further comprises transmitting each of the group of sub-RB SRS in a fraction of a shifted frequency resource of a RB at one of the multiple symbols.

In some implementations, the fraction of the shifted frequency resource of the RB for each of the group of sub-RB SRS constitute a full RB.

In some implementations, the fraction of the shifted frequency resource of the RB for each of the group of sub-RB SRS constitute a full RB.

In some implementations, the communicating component 342, such as in conjunction with processor(s) 312, memory 316, or transceiver 302, may be configured to transmit the group of sub-RB SRS at the shifted frequency resources of the multiple symbols further comprises transmitting the group of sub-RB SRS at the shifted frequency resources of the multiple symbols by using coherent transmission.

In some implementations, the coherent transmission corresponds to at least one of using the same antennas, using the same radio frequency (RF) circuit, and using continuous-phase transmission.

FIG. 6 is a flowchart of another example method 600 for wireless communication at an apparatus of a network entity. In an example, a base station 102 can perform the functions described in method 600 using one or more of the components described in FIGS. 1, 2 and 7.

At block 602, the method 600 may transmit, to a UE, a sub-RB SRS configuration message, the sub-RB SRS configuration message including a group of symbol indexes, a RB index, a frequency resource size and a frequency resource position at each symbol, a frequency resource shifting pattern, and a SRS sequence segment for each symbol. In some aspects, the communicating component 242, such as in conjunction with processor(s) 212, memory 216, or transceiver 202, may be configured to transmit, to a UE, a sub-RB SRS configuration message, the sub-RB SRS configuration message including a group of symbol indexes, a RB index, a frequency resource size and a frequency resource position at each symbol, a frequency resource shifting pattern, and a SRS sequence segment for each symbol. Thus, the base station 102, the processor(s) 212, the communicating component 242 or one of its subcomponents may define the means for transmitting, to a UE, a sub-RB SRS configuration message, the sub-RB SRS configuration message including a group of symbol indexes, a RB index, a frequency resource size and a frequency resource position at each symbol, a frequency resource shifting pattern, and a SRS sequence segment for each symbol.

At block 604, the method 600 may receive, from the UE, one or more sub-RB SRS based on the sub-RB SRS configuration message. In some aspects, the communicating component 242, such as in conjunction with processor(s) 212, memory 216, or transceiver 202, may be configured to receive, from the UE, one or more sub-RB SRS based on the sub-RB SRS configuration message. Thus, the base station 102, the processor(s) 212, the communicating component 242 or one of its subcomponents may define the means for receiving, from the UE, one or more sub-RB SRS based on the sub-RB SRS configuration message.

In some implementations, the communicating component 242, such as in conjunction with processor(s) 212, memory 216, or transceiver 202, may be configured to demodulate the one or more sub-RB SRS based on a combined full RB received signal.

In some implementations, the frequency resource size corresponds to a proportional value of the RB.

In some implementations, the frequency resource position corresponds a starting position of a frequency resource of each symbol or a frequency shift rule.

In some implementations, the frequency resource shifting pattern corresponds to an allocation of frequency resources to each symbol.

In some implementations, the SRS sequence segment corresponds to a segment of a continuous SRS sequence used at each symbol.

In some implementations, the communicating component 242, such as in conjunction with processor(s) 212, memory 216, or transceiver 202, may be configured to receive the sub-RB SRS configuration message further comprises receiving the sub-RB SRS configuration message via at least one of RRC layer signaling, MAC CE, or DCI.

In some implementations, the communicating component 242, such as in conjunction with processor(s) 212, memory 216, or transceiver 202, may be configured to transmit the one or more sub-RB SRS further comprises transmitting a group of sub-RB SRS at shifted frequency resources of multiple symbols.

In some implementations, the shifted frequency resources of the multiple symbols comprise a full RB.

In some implementations, a transmission sequence of the multiple symbols comprise a continuous SRS sequence segment with a cyclic shift.

In some implementations, the communicating component 242, such as in conjunction with processor(s) 212, memory 216, or transceiver 202, may be configured to transmit the group of sub-RB SRS further comprises transmitting each of the group of sub-RB SRS in a fraction of a shifted frequency resource of a RB at one of the multiple symbols.

In some implementations, the fraction of the shifted frequency resource of the RB for each of the group of sub-RB SRS constitute a full RB.

In some implementations, the communicating component 242, such as in conjunction with processor(s) 212, memory 216, or transceiver 202, may be configured to transmitting the group of sub-RB SRS at the shifted frequency resources of the multiple symbols further comprises transmitting the group of sub-RB SRS at the shifted frequency resources of the multiple symbols by using coherent transmission.

In some implementations, the coherent transmission corresponds to at least one of using the same a single antenna, radio frequency (RF) circuit, and continuous phase transmission.

In some implementations, the communicating component 242, such as in conjunction with processor(s) 212, memory 216, or transceiver 202, may be configured to transmit, to the network entity, a capability message indicating an ability to combine the one or more sub-RB SRS prior to transmitting the one or more sub-RB SRS.

FIG. 7 is a block diagram of a MIMO communication system 700 including a base station 102 and a UE 104. The MIMO communication system 700 may be configured to implement the combinable a sub-RB SRS transmission for coverage enhancement techniques described herein. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see such as FIGS. 1 and 2).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

An Appendix is included that is part of the present application and provides additional details related to the various aspects of the present disclosure.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication at a user equipment (UE), comprising:
   receiving, from a network entity, a sub-resource block (RB) sounding reference signal (SRS) configuration message, the sub-RB SRS configuration message including at least one of a group of symbol indexes, a RB index, a frequency resource size and a frequency resource position at each symbol, a frequency resource shifting pattern, and a SRS sequence segment for each symbol, wherein the frequency resource size corresponds to a proportional value of the RB; and
   transmitting, to the network entity, one or more sub-RB SRS based on the sub-RB SRS configuration message.

2. The method of claim 1, wherein the frequency resource position corresponds a starting position of a frequency resource of each symbol or a frequency shift rule.

3. The method of claim 1, wherein the frequency resource shifting pattern corresponds to an allocation of frequency resources to each symbol.

4. The method of claim 1, wherein the SRS sequence segment corresponds to a segment of a continuous SRS sequence used at each symbol.

5. The method of claim 1, wherein receiving the sub-RB SRS configuration message further comprises receiving the sub-RB SRS configuration message via at least one of radio resource control (RRC) layer signaling, media access control (MAC) control element (CE), or downlink control information (DCI).

6. The method of claim 1, wherein transmitting the one or more sub-RB SRS further comprises transmitting a group of sub-RB SRS at shifted frequency resources of multiple symbols.

7. The method of claim 6, wherein the shifted frequency resources of the multiple symbols comprise a full RB.

8. The method of claim 6, wherein a transmission sequence segment of the multiple symbols comprise a continuous SRS sequence with a cyclic shift.

9. The method of claim 6, wherein transmitting the group of sub-RB SRS further comprises transmitting each of the group of sub-RB SRS in a fraction of a shifted frequency resource of a RB at one of the multiple symbols, and wherein the fraction of the shifted frequency resource of the RB for each of the group of sub-RB SRS constitute a full RB.

10. The method of claim 6, wherein transmitting the group of sub-RB SRS at the shifted frequency resources of the multiple symbols further comprises transmitting the group of sub-RB SRS at the shifted frequency resources of the multiple symbols by using coherent transmission, and wherein the coherent transmission corresponds to at least one of using the same antennas, using the same radio frequency (RF) circuit, and using continuous-phase transmission.

11. The method of claim 1, further comprising transmitting, to the network entity, a capability message indicating an ability to transmit the one or more sub-RB SRS by using coherent transmission prior to transmitting the one or more sub-RB SRS.

12. A method of wireless communication at a network entity, comprising:
   transmitting, to a user equipment (UE), a sub-resource block (RB) sounding reference signal (SRS) configuration message, the sub-RB SRS configuration message including a group of symbol indexes, a RB index, a frequency resource size and a frequency resource position at each symbol, a frequency resource shifting pattern, and a SRS sequence segment for each symbol, wherein the frequency resource size corresponds to a proportional value of the RB; and
   receiving, from the UE, one or more sub-RB SRS based on the sub-RB SRS configuration message.

13. The method of claim 12, further comprising demodulating the one or more sub-RB SRS based on a combined full RB received signal.

14. The method of claim 12, wherein the frequency resource position corresponds a starting position of a frequency resource of each symbol or a frequency shift rule.

15. The method of claim 12, wherein the frequency resource shifting pattern corresponds to an allocation of frequency resources to each symbol.

16. The method of claim 12, wherein the SRS sequence segment corresponds to a segment of a continuous SRS sequence used at each symbol.

17. The method of claim 12, wherein receiving the sub-RB SRS configuration message further comprises receiving the sub-RB SRS configuration message via at least one of radio resource control (RRC) layer signaling, media access control (MAC) control element (CE), or downlink control information (DCI).

18. The method of claim 12, wherein transmitting the one or more sub-RB SRS further comprises transmitting a group of sub-RB SRS at shifted frequency resources of multiple symbols.

19. The method of claim 18, wherein the shifted frequency resources of the multiple symbols comprise a full RB.

20. The method of claim 18, wherein a transmission sequence segment of the multiple symbols comprise a continuous SRS sequence with a cyclic shift.

21. The method of claim 18, wherein transmitting the group of sub-RB SRS further comprises transmitting each of the group of sub-RB SRS in a fraction of a shifted frequency resource of a RB at one of the multiple symbols, and wherein the fraction of the shifted frequency resource of the RB for each of the group of sub-RB SRS constitute a full RB.

22. The method of claim 18, wherein transmitting the group of sub-RB SRS at the shifted frequency resources of the multiple symbols further comprises transmitting the group of sub-RB SRS at the shifted frequency resources of the multiple symbols by using coherent transmission, and wherein the coherent transmission corresponds to at least one of using the same a single antenna, radio frequency (RF) circuit, and continuous phase transmission.

23. The method of claim 12, further comprising transmitting, to the network entity, a capability message indicating an ability to transmit the one or more sub-RB SRS by using coherent transmission prior to transmitting the one or more sub-RB SRS.

24. An apparatus for wireless communication at a user equipment (UE), comprising:
a transceiver;
a memory configured to store instructions; and
one or more processors communicatively coupled with the transceiver and the memory, wherein the one or more processors are configured to execute the instructions to:
receive, from a network entity, a sub-resource block (RB) sounding reference signal (SRS) configuration message, the sub-RB SRS configuration message including at least one of a group of symbol indexes, a RB index, a frequency resource size and a frequency resource position at each symbol, a frequency resource shifting pattern, and a SRS sequence segment for each symbol, wherein the frequency resource size corresponds to a proportional value of the RB; and
transmit, to the network entity, one or more sub-RB SRS based on the sub-RB SRS configuration message.

25. The apparatus of claim 24, wherein the one or more processors are configured to transmit the one or more sub-RB SRS are further configured to transmit a group of sub-RB SRS at shifted frequency resources of multiple symbols.

26. The apparatus of claim 25, wherein the one or more processors are configured to transmit the group of sub-RB SRS are further configured to transmit each of the group of sub-RB SRS in a fraction of a shifted frequency resource of a RB at one of the multiple symbols, and wherein the fraction of the shifted frequency resource of the RB for each of the group of sub-RB SRS constitute a full RB.

27. The apparatus of claim 25, wherein the one or more processors are configured to transmit the group of sub-RB SRS at the shifted frequency resources of the multiple symbols are further configured to transmit the group of sub-RB SRS at the shifted frequency resources of the multiple symbols by using coherent transmission, and wherein the coherent transmission corresponds to at least one of using the same antennas, using the same radio frequency (RF) circuit, and using continuous-phase transmission.

28. An apparatus for wireless communication at a network entity, comprising:
a transceiver;
a memory configured to store instructions; and
one or more processors communicatively coupled with the transceiver and the memory, wherein the one or more processors are configured to execute the instructions to:
transmit, to a user equipment (UE), a sub-resource block (RB) sounding reference signal (SRS) configuration message, the sub-RB SRS configuration message including a group of symbol indexes, a RB index, a frequency resource size and a frequency resource position at each symbol, a frequency resource shifting pattern, and a SRS sequence segment for each symbol, wherein the frequency resource size corresponds to a proportional value of the RB; and
receive, from the UE, one or more sub-RB SRS based on the sub-RB SRS configuration message.

29. A method of wireless communication at a user equipment (UE), comprising:
receiving, from a network entity, a sub-resource block (RB) sounding reference signal (SRS) configuration message, the sub-RB SRS configuration message including at least one of a group of symbol indexes, a RB index, a frequency resource size and a frequency resource position at each symbol, a frequency resource shifting pattern, and a SRS sequence segment for each symbol; and
transmitting, to the network entity, one or more sub-RB SRS based on the sub-RB SRS configuration message, wherein transmitting the one or more sub-RB SRS comprises transmitting a group of sub-RB SRS at shifted frequency resources of multiple symbols.

30. An apparatus for wireless communication at a user equipment (UE), comprising:
a transceiver;
a memory configured to store instructions; and
one or more processors communicatively coupled with the transceiver and the memory, wherein the one or more processors are configured to execute the instructions to:
receive, from a network entity, a sub-resource block (RB) sounding reference signal (SRS) configuration message, the sub-RB SRS configuration message including at least one of a group of symbol indexes, a RB index, a frequency resource size and a frequency resource position at each symbol, a frequency resource shifting pattern, and a SRS sequence segment for each symbol; and
transmit, to the network entity, one or more sub-RB SRS based on the sub-RB SRS configuration message, wherein the one or more processors configured to transmit the one or more sub-RB SRS are configured to transmit a group of sub-RB SRS at shifted frequency resources of multiple symbols.

* * * * *